(12) United States Patent
Adams

(10) Patent No.: US 6,595,577 B2
(45) Date of Patent: Jul. 22, 2003

(54) AIR GUIDING DEVICE FOR A MOTOR VEHICLE

(75) Inventor: Stefan Adams, Leonberg (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 10/291,641

(22) Filed: Nov. 12, 2002

(65) Prior Publication Data

US 2003/0090126 A1 May 15, 2003

(30) Foreign Application Priority Data

Nov. 10, 2001 (DE) .......................................... 101 55 376

(51) Int. Cl.$^7$ ................................................ B64C 3/58
(52) U.S. Cl. ..................................... 296/180.1; 180/903
(58) Field of Search .......................... 296/180.1, 180.2, 296/180.3, 180.4, 180.5; 180/903

(56) References Cited

U.S. PATENT DOCUMENTS

| 6,170,904 | B1 | * | 1/2001 | Schaedlich et al. ...... | 296/180.1 |
| 2002/0021022 | A1 | * | 2/2002 | Erdelitsch et al. ....... | 296/180.1 |

FOREIGN PATENT DOCUMENTS

| DE | 37 11 386 A1 | 4/1987 |
| DE | 4427196 | 2/1996 |

OTHER PUBLICATIONS

"Height adjusting element for adjusting, forming and adjusting" Maschinenelemente, vol. 32, 1993, No. 5, pp. 51–52.

* cited by examiner

Primary Examiner—Joseph D. Pape
(74) Attorney, Agent, or Firm—Crowell & Moring LLP

(57) ABSTRACT

An air guiding device for a motor vehicle includes an air guiding element that is displaceable by a deployment device, between operative and inoperative positions. In its inoperative position, it is lowered with respect to a stationary vehicle body shell and, in its operative position it is deployed outward, projecting beyond the vehicle body shell. The deployment device has at least one deployment element with a deployment arm that is displaceably disposed in a guide housing. The air guiding element is arranged on the fastening end of the deployment arm. The deployment element is equipped with a manually operable adjusting device in order to align the air guiding element in its inoperative position relative to the vehicle body shell. To adjust the air guiding element in its inoperative position relative to the vehicle body shell, the deployment element has an internal or external-thread section on its fastening end as an adjusting arrangement. The latter extends in the longitudinal direction of the tilt-out element and has an adjusting device screwed thereon, which adjusting device has a counterthread section. The air guiding element is fastened to the free end of the adjusting device.

10 Claims, 3 Drawing Sheets

AIR GUIDING DEVICE FOR A MOTOR VEHICLE

BACKGROUND AND SUMMARY OF THE INVENTION

This application claims the priority of 101 55 376.5, filed Nov. 10, 2001, the disclosure of which is expressly incorporated by reference herein.

The invention is directed to an air guiding device for a motor vehicle.

A vehicle air guiding device of the generic type is disclosed, for example, in German Patent Document DE 37 11 386 A1. It comprises a deployment device and an air guiding element (particularly a rear spoiler), which can be displaced between operative and inoperative positions by means of the deployment device. In its inoperative position, the air guiding element is lowered with respect to a stationary shell of the vehicle body and, in the operative position, it is deployed outward to project beyond the vehicle body shell. The deployment device has at least one deployment element with a deployment arm displaceably disposed in a guide housing, the air guiding element being arranged on the fastening end of the deployment arm. In addition, the deployment element is equipped with a manually operable adjusting device by means of which the air guiding element can be aligned in its inoperative position relative to the shell of the vehicle body. For such alignment, a tube extension is inserted into the deployment arm, which is constructed as a hollow body; the tube extension can be fastened inside the deployment arm in various displacement positions. For the latter purpose, an oblong hole is provided at the tube extension, and a fastening screw reaches through the oblong hole and being screwed into the deployment arm. The air guiding element is fastened to the free end of the tube extension.

One object of the invention is to provide an air guiding device for a motor vehicle which permits a simple alignment of the air guiding element with respect to the shell of the vehicle body.

This and other objects and advantages are achieved by the air guiding device according to the invention, which includes an air guiding element that is displaceable, by means of a deployment device, between operative and inoperative positions. In its inoperative position, it is lowered with respect to a stationary vehicle body shell and, in its operative position it is deployed outward, projecting beyond the vehicle body shell. The deployment device has at least one deployment element with a deployment arm that is displaceably disposed in a guide housing. The air guiding element is arranged on the fastening end of the deployment arm. The deployment element is equipped with a manually operable adjusting device in order to align the air guiding element in its inoperative position relative to the vehicle body shell. To adjust the air guiding element in its inoperative position relative to the vehicle body shell, the deployment element has an internal or external-thread section on its fastening end as an adjusting arrangement. The latter extends in the longitudinal direction of the deployment element and has an adjusting device screwed thereon, which adjustment device has a counterthread section. The air guiding element is fastened to the free end of the adjusting device.

By means of the air guiding device according to the invention, a very precise and gradual alignment of the air guiding element in its inoperative position exists relative to the shell of the vehicle body. In particular, the height (Z-direction) of the air guiding element relative to the shell of the vehicle body can be adjusted on the air guiding device according to the invention.

According to a further embodiment of the invention the air guiding element need not be demounted during an adjustment of the adjusting element.

In another embodiment, an arrangement is provided for simple fastening of the air guiding element on the adjusting device.

According to a feature of the invention, if the fastening opening is constructed as an oblong hole, in addition to the above-mentioned alignment possibility in the Z-direction, another alignment can be achieved which is oriented either in the X-direction or Y-direction, depending on the direction of the oblong hole. As a result, the gap between the air guiding element and the shell of the vehicle body can be adjusted to a desired measurement.

In still another embodiment of the invention, the fastening opening may have a larger inside diameter than the outside diameter of the fastening section, so that alignment is achieved in the Z-direction as well as in the Y-direction.

In yet another embodiment the air guiding element can be produced in two parts consisting of a base part and a cover closing off the base part, providing an access to the adjusting device when the cover is removed.

Finally, according to another feature of the invention, the adjusting device can be operated in a simple manner by way of the molded application element, and can be adjusted precisely in order to obtain the desired relative position of the air guiding element with respect to the shell of the vehicle body.

Other objects, advantages and novel features of the present invention will become apparent from the following detailed description of the invention when considered in conjunction with the accompanying drawings.

DETAILED DESCRIPTION OF THE DRAWINGS

Figure 1:
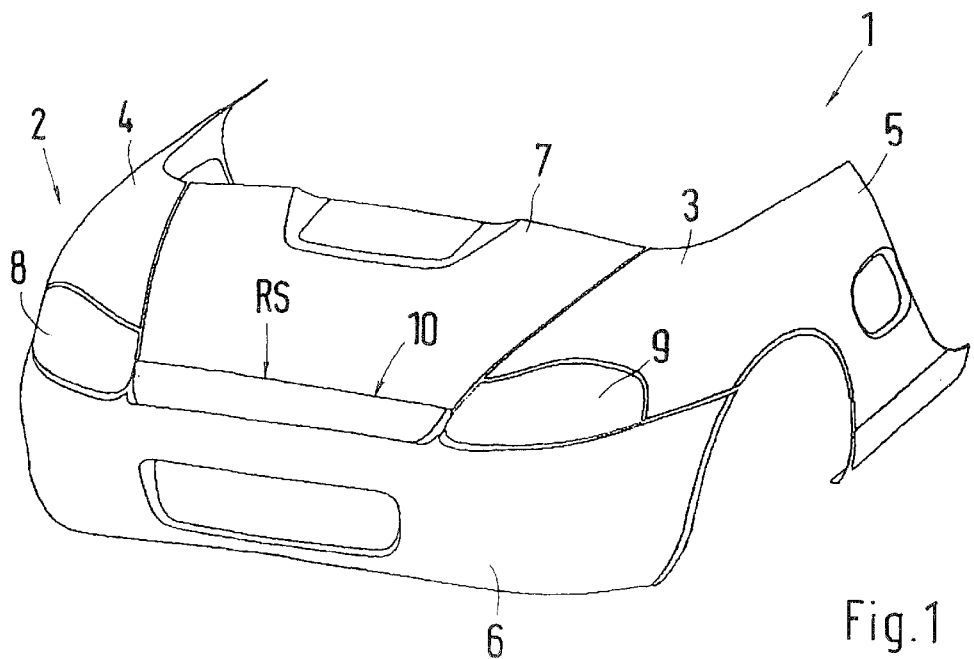
FIG. 1 is a partial view of a rear part of a motor vehicle with the air guiding element according to the invention in the inoperative position.

FIG. 1 shows a broken away view of a motor vehicle 1, of which the rear part 2 is illustrated here, whose body shell 3 comprises rear fenders 4 and 5, a rearward end 6 as well as an access lid 7 for a receiving space situated underneath. In addition, tail lights 8 and 9 may be inserted into the rear part which close off, for example, flush with the shell 3.

The motor vehicle 1 has at least one air guiding device 10 which, in the present embodiment of the motor vehicle 1, is assigned to the rear part 2 and represents a rear spoiler which can be moved out and which may be called a spoiler edge. FIG. 1 shows the air guiding device in an inoperative position RS in which it is at least partially lowered with respect to the stationary shell 3 of the vehicle body.

Figure 2:
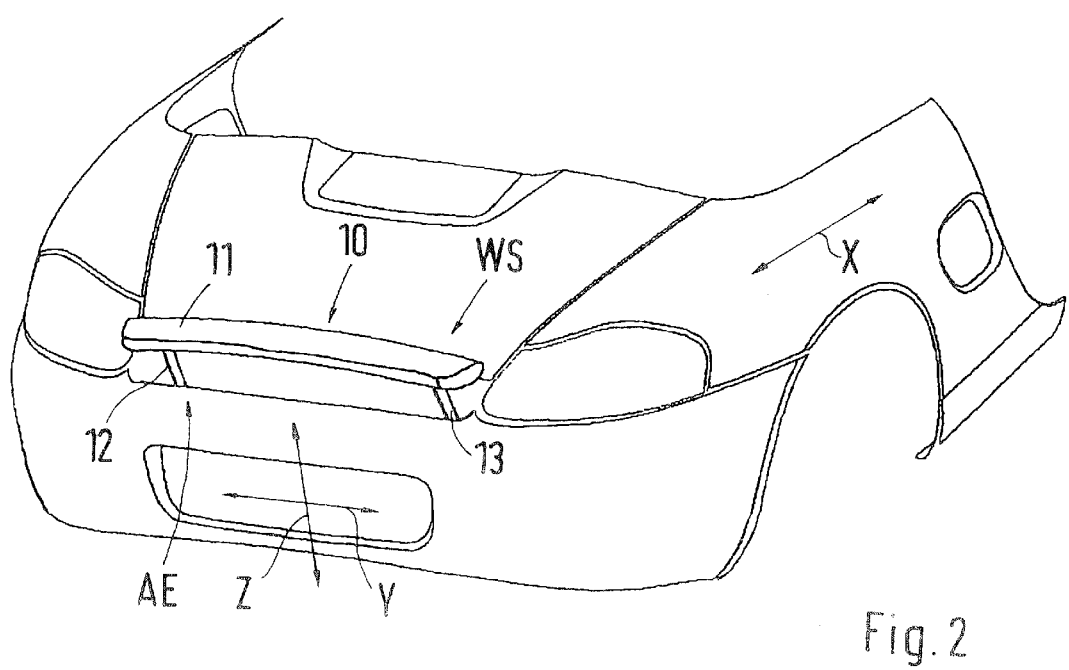
FIG. 2 is a view of the rear part of the motor vehicle with the air guiding element moved out into the operative position.

In FIG. 2, the air guiding device is deployed into its operative position WS, by displacement in the Z-direction of an air guiding element 11 of the air guiding device 10. The Z-direction extends essentially parallel to a vertical axis of the vehicle. The air guiding element 11 is constructed in a strip shape and with a corresponding aerodynamic cross-section and extends essentially parallel to the Y-direction, parallel to the transverse axis of the vehicle. In the X-direction, which is aligned approximately parallel to the longitudinal axis of the vehicle, the dimension of the strip-shaped air guiding element 11 is considerably smaller than in the Y-direction.

Figure 3:
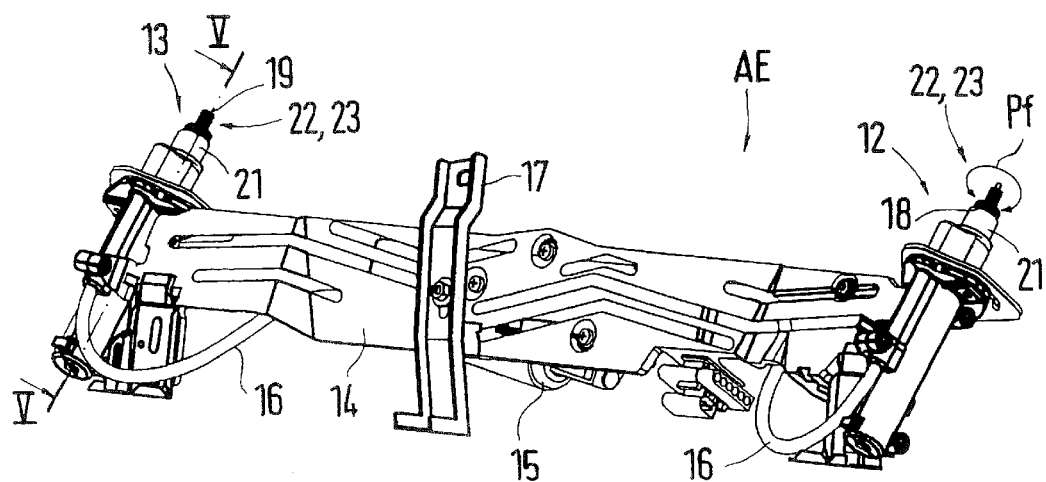
FIG. 3 is a view of a deployment device for the air guiding element according to the invention.
Figure 4:
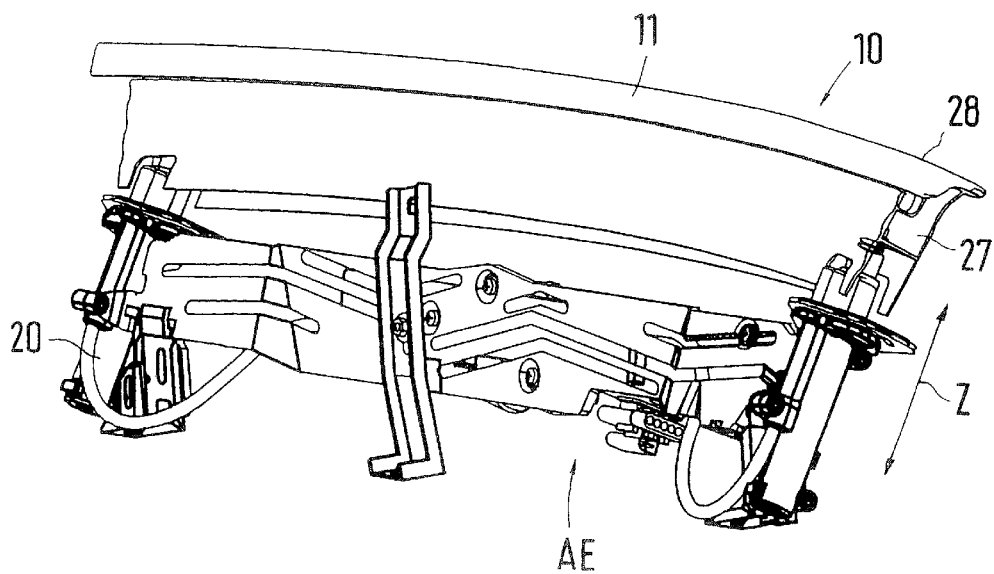
FIG. 4 is a view of the deployment device with the air guiding element arranged thereon.
Figure 5:
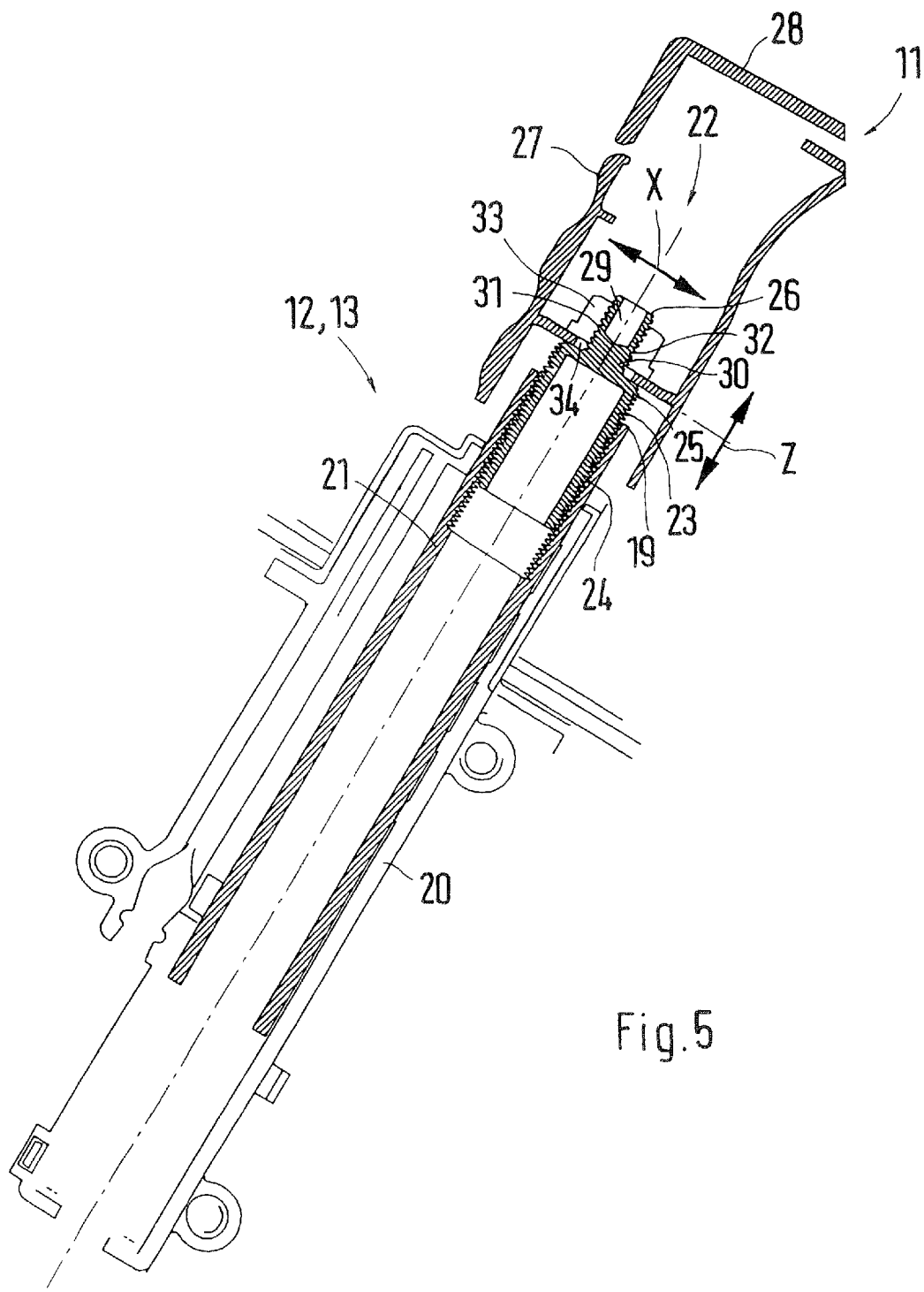
FIG. 5 is a sectional view along Line V—V of a deployment element of the deployment device.

For (for example) speed-dependent displacement of the spoiler edge 10 from the inoperative RS into the operative position WS and vice-versa, a deployment device AE is provided, of which FIG. 2 shows only two deployment elements 12,13 that are spaced with respect to one another in the Y-direction. As shown in to FIG. 3, the two deployment elements 12,13 are mounted on an equipment carrier 14 which, in addition, carries a driving device 15 for the deployment elements 12,13. The driving device 15 may be, for example, as an electric motor which drives the deployment elements 12,13 by way of tension and pressure cables which are laid in cable ducts 16. For a fastening of the equipment carrier 14 on the body of the motor vehicle 1, a fastening support 17 may also be provided. Each deployment element 12,13 has a fastening end 18 and 19 respectively, to which the air guiding element 11 is linked. For displacement of the air guiding element 11 in the Z-direction, the lengths of the deployment elements 12,13 can be changed in a telescoping manner. For this purpose, each deployment element has a deployment arm 21 which can be guided axially out of a guide housing 20, as illustrated in the sectional view of FIG. 5.

To align the air guiding element 11 in the inoperative position RS with respect to the shell 3 of the vehicle body (so that the air guiding element closes off, for example, flush with the surface of access lid 7 and the rearward end 6), each deployment element 12,13 has a manually operable adjusting arrangement 22 which has an adjusting device 23 by way of which the air guiding element 11 is connected with the fastening end 19. Each adjusting arrangement 22 comprises an internal-thread section 24 formed on the deployment arm 21, which internal-thread section 24 interacts with an externally threaded counterthread section 25 on the adjusting device 23. Alternatively, it is of course possible to mount an external-thread section instead of the internal-thread section 24 and to construct the counterthread section 25 as an internal-thread section. Independently of which of these embodiments is provided, the air guiding element 11 is fastened to the free end 26 of the adjusting device 23. By rotating the adjusting device 23 in the rotating direction Pf (FIG. 3), it is possible to adjust the axial distance between the fastening end 18 and 19 respectively and the free end 26 on the adjusting device 23.

The air guiding element 11 is constructed in two parts and comprises a (for example) hollow base part 27 as well as a lid 28 closing off the base part 27. When the lid 28 is removed, the adjusting device 23 is accessible from above so that an adjusting tool (not shown) can be applied to a molded application element 29 of the adjusting device 23. Instead of the removable lid 28, openings, which can be covered, may be provided in the lid 28 above the respective adjusting device 23.

The adjusting device 23 is constructed as a stepped bolt 30, in which the counterthread section 25 is constructed on the section of the bolt 30 which has the larger diameter. The base part 27 of the air guiding element 11 rests on the transition step 31 of the bolt 30, and the section of the adjusting device 23 with the smaller diameter reaches through it. This section therefore forms a fastening section 32 on which a securing device 33 is mounted by means of which the air guiding element 11 is held in a secure manner. The fastening section 32 may comprise a thread onto which the securing device 33 is screwed. Furthermore, the fastening section 32 reaches through a fastening opening 34 which is provided at the air guiding element 11 and which may be constructed as an oblong hole and extends in the X- or Y-direction. As an alternative, it is also possible to provide the fastening opening 34 with an inside diameter which is larger than the outside diameter of the fastening section 32, whereby an alignment of the air guiding element 11 is provided in the X- and Y-direction. Since the adjusting device 23 can be rotated relative to the air guiding element 11 when the securing device 33 is released and, in addition, the lid 28 can be removed, no demounting of the complete air guiding element 11 is required for an alignment in the Z-direction. Furthermore,—depending on the construction of the fastening opening 34—, when the securing device 32 is released, adjustment is possible in the X- and/or Y-direction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air guiding device for a motor vehicle, having an air guiding element which is displaceable by a deployment device between operative and inoperative positions and which, in its inoperative position, is lowered with respect to a stationary vehicle body shell and, in its operative position, is deployed outward, projecting beyond the vehicle body shell; wherein:

the deployment device has at least one deployment element with a deployment arm which is displaceably disposed in a guide housing;

the air guiding element is arranged on a fastening end of the deployment arm;

the deployment element has a manually operable adjusting arrangement for aligning the air guiding element relative to the vehicle body shell in its inoperative position;

the adjusting arrangement comprises an internal or external-thread section that is formed on the fastening end of the deployment arm and extends in a longitudinal direction of the deployment element, and an adjusting device with a counterthread section;

the adjusting device is screwed onto the internal or external thread section; and the air guiding element is fastened to a free end of the adjusting device.

2. The air guiding device according to claim 1, wherein:

the adjusting device is rotatable relative to the air guiding element; and on its free end, the adjusting device has a fastening section which engages in the air guiding element.

3. The air guiding device according to claim 1, wherein:

the air guiding element has a fastening opening through which the fastening section extends; and the air guiding element is held on the fastening section by a securing device.

4. The air guiding device according to claim 2, wherein:

the air guiding element has a fastening opening through which the fastening section extends; and the air guiding element is held on the fastening section by a securing device.

5. The air guiding device according to claim 3, wherein the fastening opening comprises an oblong hole.

6. The air guiding device according to claim 4, wherein the fastening opening comprises an oblong hole.

7. The air guiding device according to claim 3, wherein the fastening opening has an inside diameter that is larger than an outside diameter of the fastening section.

8. The air guiding device according to claim 4, wherein the fastening opening has an inside diameter that is larger than an outside diameter of the fastening section.

9. The air guiding device according to claim 1, wherein:

the air guiding element comprises a base part and a lid closing off the base part; and the base part is fastened to the free end of the adjusting device.

10. The air guiding device according to claim 9, wherein the adjusting device has a molded application element for an adjusting tool at its free end situated in the base part.

* * * * *